United States Patent
Hundebøl

(10) Patent No.: US 8,439,176 B2
(45) Date of Patent: May 14, 2013

(54) COUPLING

(75) Inventor: Keld Otting Hundebøl, Ansager (DK)

(73) Assignee: HH Patent A/S, Ansager (DK)

( * ) Notice: Subject to any disclaimer, the term of this patent is extended or adjusted under 35 U.S.C. 154(b) by 329 days.

(21) Appl. No.: 12/812,487

(22) PCT Filed: Feb. 3, 2009

(86) PCT No.: PCT/DK2009/000027
§ 371 (c)(1),
(2), (4) Date: Sep. 29, 2010

(87) PCT Pub. No.: WO2009/100721
PCT Pub. Date: Aug. 20, 2009

(65) Prior Publication Data
US 2011/0011696 A1   Jan. 20, 2011

(30) Foreign Application Priority Data
Feb. 11, 2008   (DK) .................................. 2008 00187

(51) Int. Cl.
*F16D 13/04* (2006.01)
*F16D 43/04* (2006.01)

(52) U.S. Cl.
USPC ...................................................... 192/41 R

(58) Field of Classification Search ................ 192/41 R, 192/45.001, 54.1, 54.2, 43, 107 T
See application file for complete search history.

(56) References Cited

U.S. PATENT DOCUMENTS

| | | | | |
|---|---|---|---|---|
| 2,582,010 A | * | 1/1952 | Crosby | 242/571.6 |
| 3,490,570 A | * | 1/1970 | Fulton | 192/41 R |
| 3,685,757 A | * | 8/1972 | Fedor | 242/571.6 |
| 3,767,019 A | | 10/1973 | Wingler | |
| 6,354,414 B1 | | 3/2002 | Sueshige et al. | |

FOREIGN PATENT DOCUMENTS

| | | |
|---|---|---|
| DE | 1750227 A1 | 4/1971 |
| DE | 19729620 A1 | 1/1998 |
| EP | 190017 A1 | 8/1986 |
| EP | 307903 A1 | 3/1989 |
| FR | 2605371 A1 | 4/1988 |
| JP | 60125420 A | 7/1985 |

OTHER PUBLICATIONS

International Search Report.
Danish Search Report.

* cited by examiner

*Primary Examiner* — David D Le
*Assistant Examiner* — Ryan Dodd
(74) *Attorney, Agent, or Firm* — William J. Sapone; Ware Fressola Maguire & Barber LLP

(57) ABSTRACT

When, according to the invention, a coupling is provided between a driving shaft (1) and a hub (6), the shaft (1) being configured with several sets of grooves (2, 3) in which an elastic cord (4) may extend, the cord (4) in the deep track (2) will have a slight or poor engagement with the hub (6), while the cord in the low track (3) will be pressed out into firm engagement with the hub (6).

8 Claims, 3 Drawing Sheets

COUPLING

CROSS REFERENCE TO RELATED APPLICATIONS

This application is a national stage of PCT International patent application no. PCT/DK2009/000027, filed Feb. 3, 2009, which claimed priority in Danish patent application no. PA 2008 00187, filed Feb. 11, 2008.

TECHNICAL FIELD

The invention relates to a coupling comprising a driving shaft or spindle which is capable of engaging a surrounding driven hub, said shaft or spindle being configured with three or more longitudinal sets of grooves or tracks in which a cord may extend, said grooves or tracks having two depths so that the cord may extend either in the deep track or in the low track, whereby there is no or slightly driving or firmly driving contact, respectively, with the hub.

BACKGROUND OF THE INVENTION

Couplings of this type are known in many different embodiments, depending on operating conditions and on the purposes which the coupling, in general, is to serve.

Where, e.g., a grinding tool is involved, it must be capable of centering the tool precisely, just as the coupling must be easy to operate with a view to replacement of the tool, either because it is worn, or where another tool is needed.

Normally, such couplings are constructed as a spindle having threads, it being possible to clamp the tool to the shaft by means of a flange and a bolt.

However, this requires partly a tool, partly a very precise machining of the surfaces or the fit between shaft and hub. The latter makes it expensive to manufacture the coupling.

Where a one-way coupling is needed, a mechanical toothed arrangement with pawls or the like will normally have to be incorporated. Such a mechanical device, too, is relatively expensive to manufacture, and it also requires maintenance.

Another coupling type of the type defined in the invention is known from DE 1750227.

This coupling comprises a driving shaft which is capable of making no, slightly driving or firmly driving contact, respectively, with a surrounding, driven hub, and a plurality of loose bodies, which extend in grooves in the exterior of the driving shaft, will be able to engage the driven shaft by means of the centrifugal force.

This coupling is vitiated by certain defects and drawbacks, which are primarily caused by the fact that the coupling is imprecise, as it may tend to be engaged and/or disengaged non-uniformly, which will have as a result that the centering is imprecise because of the uneven coupling engagement.

To this should be added the relatively large number of elements comprised by the coupling, which adds to the manufacturing costs.

SUMMARY OF THE INVENTION

It is the object of the invention to provide a coupling which is simple and reliable in operation, precise in its coupling-together of the parts and their positioning, and thereby centering of the engaging parts, noiseless and moreover maintenance-free as well as easy to disassemble without the use of tools.

This is achieved according to the invention by means of a coupling, wherein the cord is made of an elastic material.

A coupling function is achieved in this manner, as the elastic cord in the deep track involves no or only slightly driving contact with the surrounding hub. Rotation of the shaft will cause the cord to be transferred from the deep track to the low track, thereby applying an outwardly directed force to the hub, so that the parts are coupled together firmly. This results in partly a uniform transfer of torque, partly an absolute centering of the parts, where, normally, three sets of tracks are used.

It is ensured hereby that by the movement against the normal direction of rotation in operation the cord will be released from the engagement and thereby ensure that the driven hub and the tool may pulled off the shaft or spindle easily and without difficulty. This takes place merely by stopping the rotation and, by means of a slight backwards movement of the hub, will release this from the engagement with the driving shaft.

A one-way coupling is established hereby, which simultaneously ensures a very precise centering of the parts, if the sets of the grooves extend equidistantly on the shaft. In some cases, this will mean that a larger diameter requires more sets of tracks than three sets.

No noticeable wear of the parts will occur in operation, and, therefore, the coupling will be just about maintenance-free.

When the bottoms of the grooves are configured to be curved and the cord is configured with a circular cross-sectional shape, there will be an even impact on the cord during its pressing-out and thereby engagement.

When the cords are mounted such that they are passed between openings through the shaft or spindle at the ends, the cords may be mounted and secured in a state in which there is a suitable tightening because of the elasticity of the cords.

Finally, it is expedient to secure the cords by means of a bead, a clamp or the like internally in the shaft or spindle at the ends of the cords.

BRIEF DESCRIPTION OF THE DRAWINGS

An example of an embodiment of the invention will be described more fully below with reference to the drawing, in which.

DETAILED DESCRIPTION OF THE INVENTION

Figure 1:
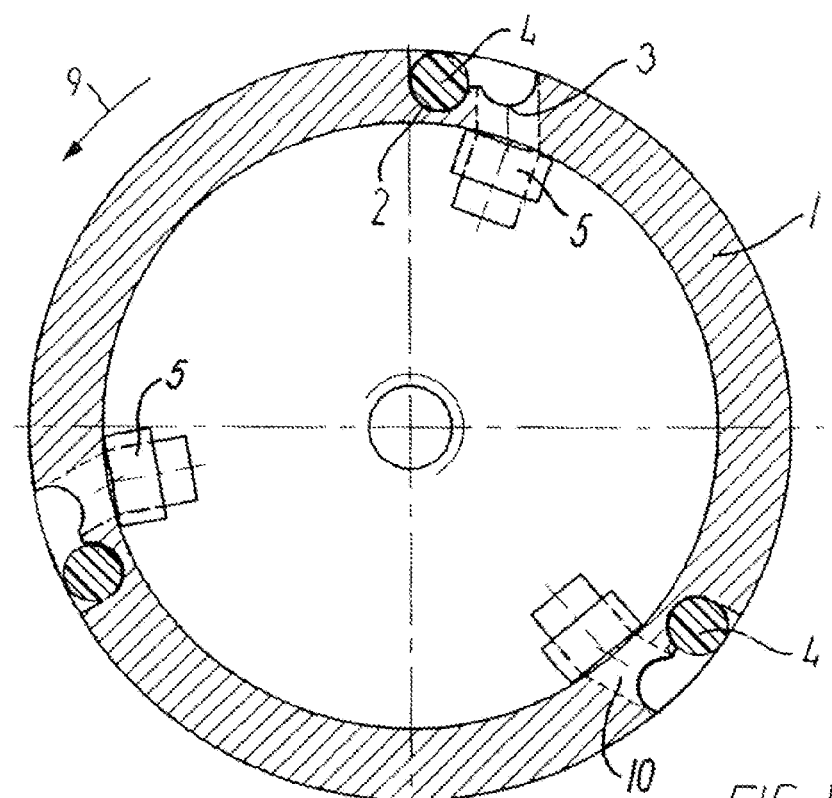
FIG. 1 shows a sectional view of a shaft or spindle with three cords, which are disposed in the deep tracks.
Figure 2:
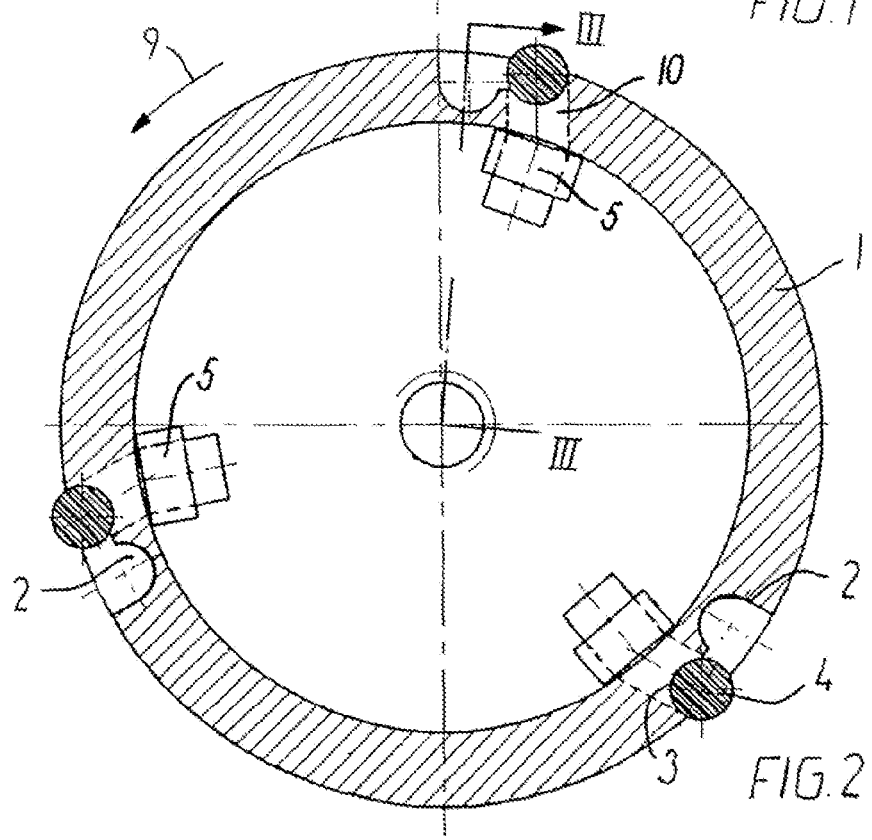
FIG. 2 shows a sectional view where the cords extend in the low tracks.

The coupling according to the invention comprises a spindle or shaft 1, which is shown in cross-section in FIGS. 1 and 2.

Figure 4:
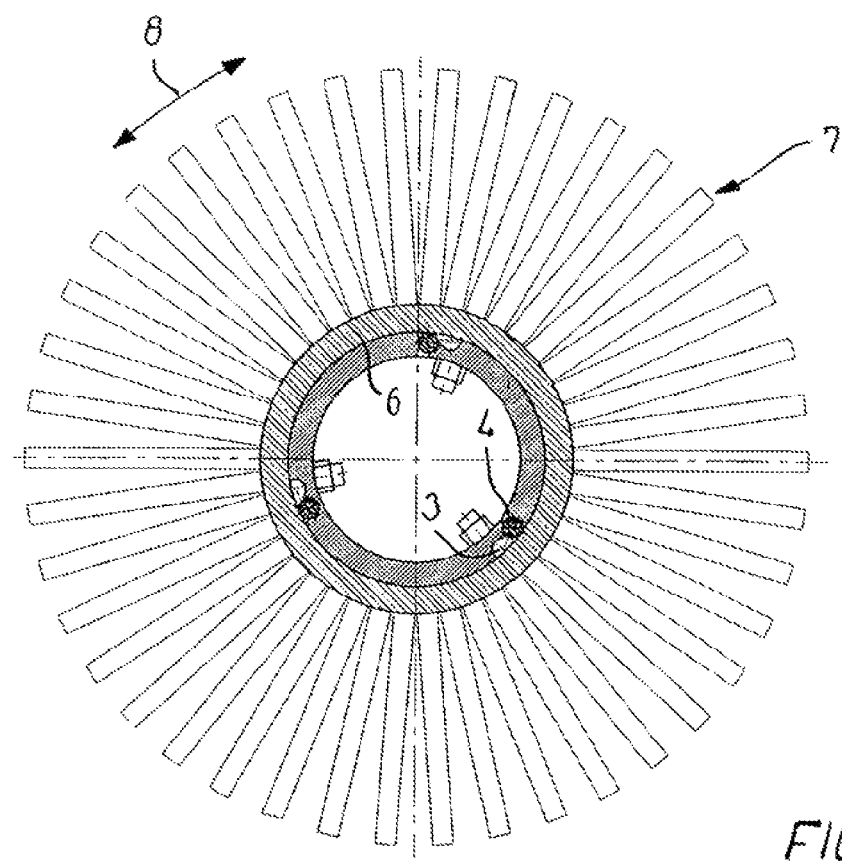
FIG. 4 shows a working tool during mounting and thereby in a dis-engaged state.
Figure 5:
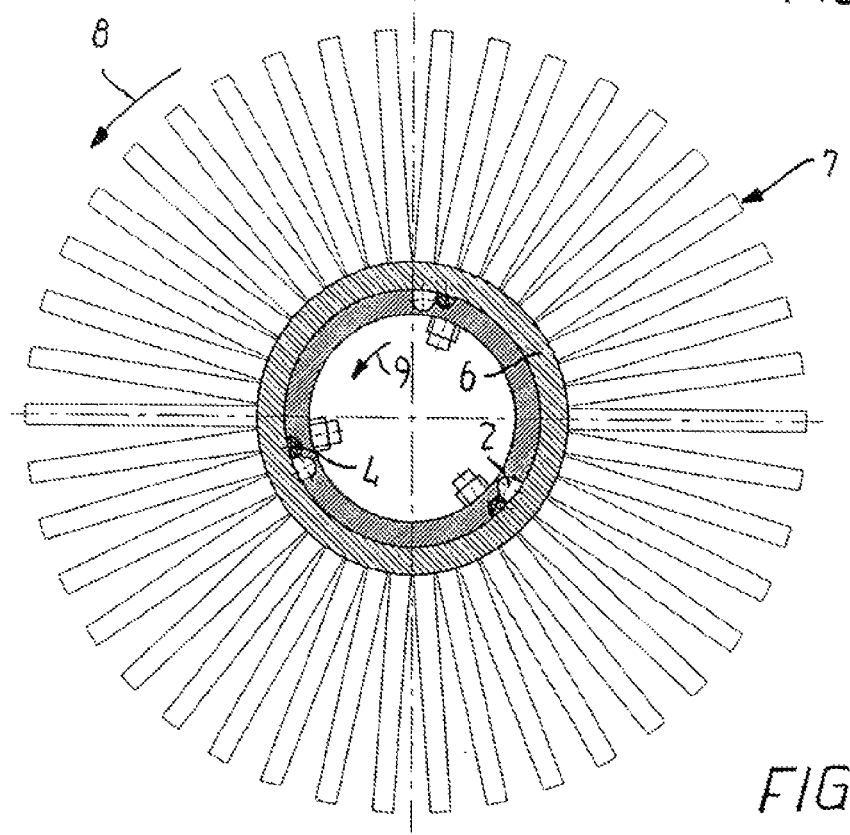
FIG. 5 shows the tool coupled together with the shaft or spindle.

A hub 6, e.g. as shown in FIGS. 4 and 5, may be inserted on to this spindle or shaft 1 by a tool 7.

It should be observed that the hub 6 is formed by a hollow body of rotation without any requirements whatsoever with respect to the configuration, as the bore merely has to have a diameter which is slightly larger than the diameter of the spindle or shaft 1.

Therefore, the coupling can work with an arbitrarily long hub, provided that this is configured with an inner bore.

Figure 3:
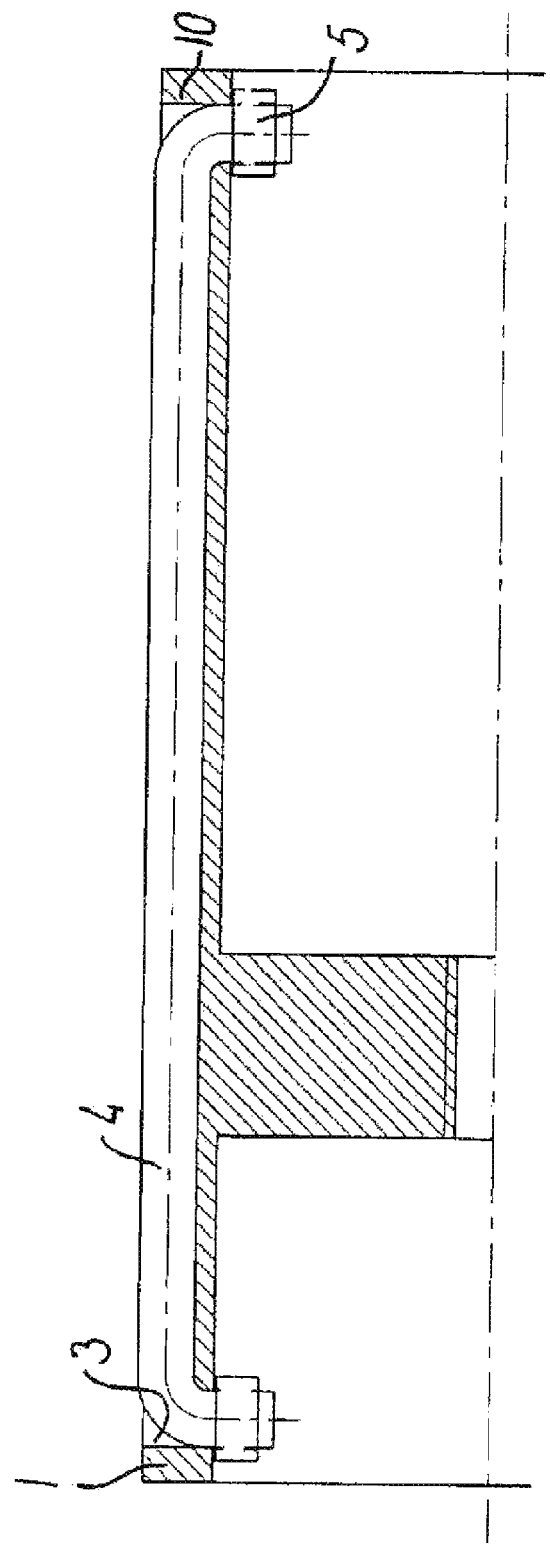
FIG. 3 shows a longitudinal sectional view of the shaft or spindle, seen in the direction III-III in FIG. 2.

The description will therefore comprise the spindle or shaft 1, as shown in FIGS. 1-3.

In the following, the designation of the spindle or shaft will be spindle alone, which is connected with a rotating rotor (not shown) in a generally known manner. In the example shown, the spindle 1 is configured as a length of pipe. Three sets of grooves 2, 3 are arranged on the surface, offset 120 degrees. This ensures a completely precise alignment of the hub, as will be explained later.

As shown in FIGS. 1 and 2, each set of grooves consists of two grooves 2 and 3, the one groove 2 being deeper than the other one 3.

The deep groove 2 is disposed in front of the lower groove 3 seen in the direction of rotation 9.

These grooves extend longitudinally of the spindle 1, as shown in FIG. 3.

The cross-sectional shape is as shown with round bottoms. The purpose of these grooves 2, 3 is to provide a seat for a cord 4, which is preferably made of flexible plastics, such as silicone or a similar material, corresponding to what is used for the manufacture of O-rings or the like.

The diameter of the cord 4 may e.g. be 8 mm, and the length is adapted to the length of the spindle 1.

To secure the cord 4, a bore 10 is provided at both ends of the grooves 2, 3, so that the cord 4 may extend between the bores 10, as indicated in FIG. 3.

The cord 4 is secured by means of clamping rings 5 or the like.

The function will now be explained with reference to FIGS. 4 and 5.

In FIG. 4, the spindle 1 and the hub 6 have been joined, and the cord 4 is in the front deep groove 2. With the cord 4 in this groove 2, there is no contact between the parts 1 and 6, and the coupling is thereby in its disengaged position.

Therefore, the hub 6 may be rotated freely in both its directions of rotation, as indicated by arrows 8. Hereby, the hub with the tool 7 may freely be pulled off and be applied to the spindle 1.

In the applied position, a rotation of the hub will cause movement of the cords 4 from the deep track 2 to the low track 3, which means that the cords 4 are pressed to engage the internal side of the hub 6, as shown in FIG. 5, and the coupling is thereby engaged.

The parts are thus coupled together, and the tool 7 may be driven precisely in the direction of the arrow 8, since it is centered by the cords 4.

In case of change, the rotation is stopped, and the tool 7 with the hub 6 may be moved a small distance against the direction of rotation, whereby the cords 4 will be moved back into the deep grooves 2, whereby the pressure against the hub 6 ceases. Then, the hub may easily be replaced by another one, following which the engagement may take place as described above.

Where transfer of great torques or large dimensions are involved, more than the described three sets of grooves 2 and 3 may be provided.

What is claimed is:

1. A cord coupling for engaging and disengaging a driving shaft with a driven hub disposed concentrically thereover and spaced therefrom comprising:
    a driving shaft configured with three or more longitudinal pairs of grooves provided in an outer drive surface thereof;
    three or more cords made of an elastic material;
    each pair of grooves having a deep groove having a deep track of a depth sufficient for a cord to reside therein out of contact with the driven hub disposed over the driving shaft, and a shallow groove adjacent to the deep groove having a shallow depth sufficient for a cord to reside therein with a portion of the cord extending beyond the outer drive surface in an amount sufficient to bridge the space between the driving shaft and the driven hub,
    each cord being secured and tightened within each shallow groove for a full length thereof when the driving shaft is not rotating, the deep groove being disposed adjacent to the shallow groove in a direction of rotation of the driving shaft, such that upon rotation of the driving shaft, the three or more cords are elastically displaced from the deep groove into the shallow groove, the three or more cords filling the space between the driving shaft and the driven hub which is thereby locked by the three or more cords into rotation with the driving shaft, and such that rotating the driven hub in a direction opposite to the rotating direction displaces each cord into the deep groove such that the driven hub is disengaged and removable from the driving shaft.

2. The cord coupling according to claim 1, wherein each groove has a curved bottom, and each cord has a correspondingly round cross-sectional shape.

3. The cord coupling according to claim 1, wherein the driving shaft has bores located at each end of each shallow groove, ends of each cord being fixed therein.

4. The coupling according to claim 3 further comprising an attachment device located on an inner side of each bore for securing the cord ends to the shaft.

5. The coupling according to claim 4 wherein the attachment devices are selected from the group consisting of a bead and a clamping ring.

6. The coupling according to claim 2, wherein the driving shaft has bores located at each end of each shallow groove, ends of each cord being fixed therein.

7. The coupling according to claim 6 further comprising an attachment device located on an inner side of each bore for securing the cord ends to the shaft.

8. The coupling according to claim 7 wherein the attachment devices are selected from the group consisting of a bead and a clamping ring.

\* \* \* \* \*